ced May 2, 1967

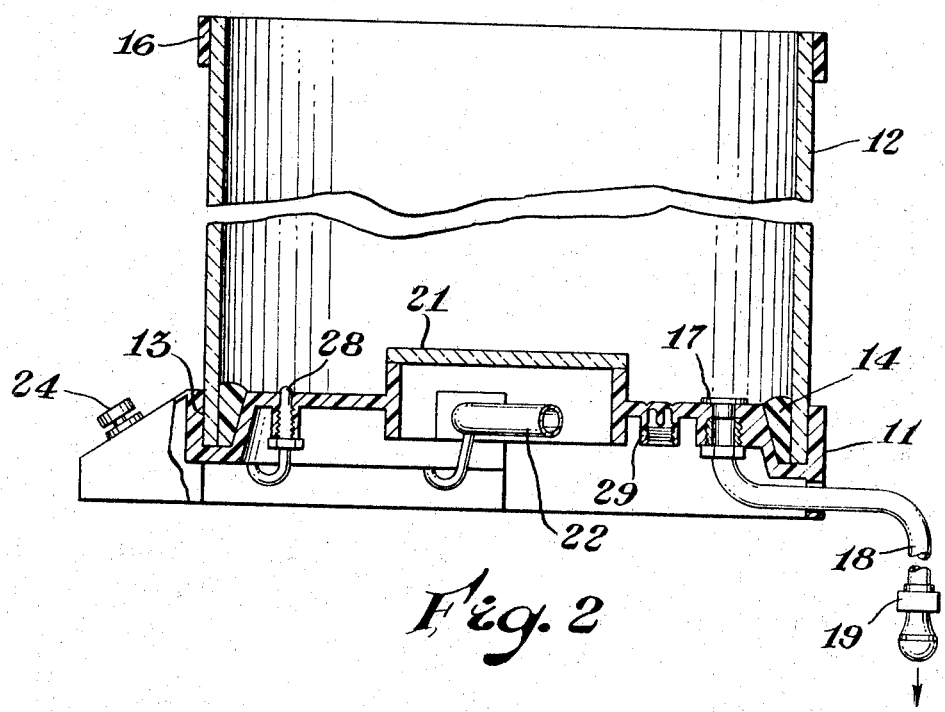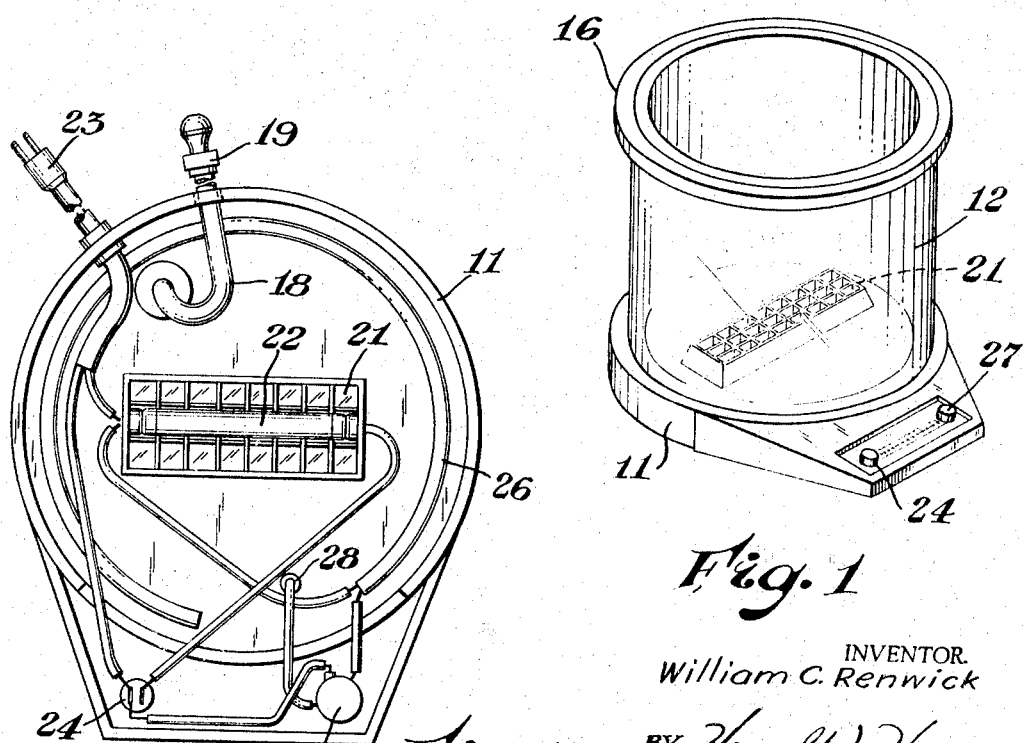

3,316,882
THIN WALLED COLLAPSIBLE AQUARIUM
William C. Renwick, Midland, Mich., assignor to Dow Corning Corporation, Midland, Mich., a corporation of Michigan
Filed Aug. 6, 1965, Ser. No. 477,727
6 Claims. (Cl. 119—5)

The present invention relates to liquid confining means and more particularly to liquid containers having transparent wall portions to allow observation of the contents of the container.

Liquid confining devices such as aquariums, decorative bowls, and similar structures have in the past generally been made of rigid materials such as glass, which are difficult to ship and store. Furthermore, they are often easily broken and when broken may constitute a hazard due to sharp and ragged edges. Aquariums which contain fish and/or other aquatic life must often be partially drained to change water or for purposes of cleaning. Large glass aquariums are heavy and difficult to drain and aquatic life may be harmed by being poured from the aquarium. A further disadvantage of aquariums currently in use is the necessity for providing air bubbles or special lighting such as ultraviolet lamps for certain types of aquatic life. Devices such as these are generally installed from the top of the container and obstruct vision, as well as detract from the aesthetic appearance of the aquarium.

An object of the present invention is to provide an improved liquid container structure suitable for use as an aquarium.

Another object is to provide an aquarium structure which eliminates the aforementioned deficiencies in prior art aquarium structures.

In accordance with these and other objects there is provided by the present invention a structure for containing liquids which structure comprises a rigid base upon which is mounted a collapsible cylindrical wall which is held upright by hydrostatic pressure when filled with liquid. The base may be made of molded plastic material and may contain provisions for draining and for providing oxygen, heating, filtration, special lighting and other accessories without obstructing view of the contents of the container.

The wall may be made of transparent plastic film such as Mylar and may be tinted, if desired, to produce special aesthetic effects. For decorative effects and/or magnification and diminution of the contents, patterns or magnifying lens shapes may be embossed in the material. The structure, when empty, folds compactly for ease in shipping and storage and is capable of withstanding rough handling without danger of breakage. Even if it should be broken by extreme abuse, the danger of persons being cut by broken glass is eliminated.

Other objects and attendant advantages of the invention will become obvious to those skilled in the art from a consideration of the following detailed description when read in conjunction with the accompanying drawings wherein:

FIG. 1 is a view in perspective of an aquarium made in accordance with the present invention;

FIG. 2 is a vertical cross-sectional view of the aquarium shown in FIG. 1; and

FIG. 3 is a bottom view of the aquarium of FIG. 1 illustrating the inclusion of aquarium accessories in the aquarium base.

Referring now to the drawings, wherein like reference numerals designate like or corresponding parts throughout the several views, there is shown in FIG. 1 an aquarium comprising a molded rigid base member 11 upon which is mounted a thin walled cylindrical tube 12 of transparent flexible material which is adapted to be filled with water. The base member 11 may be made of any suitable rigid material, such as plastic, having sufficient strength to support the weight of the water to be placed in the tube 12. The tubular member 12 in accordance with the invention is sufficiently flexible to allow it to collapse for ease in shipping and handling while empty. It must also have sufficient strength to support the weight of the water and if ultraviolet lighting is to be used in the aquarium it should be resistant to deterioration by the ultraviolet radiation. One material which has been found particularly suitable for this use is Mylar, sold by the DuPont Company.

As may seen more clearly from FIG. 2, the base 11 is provided with a bearing portion 13 which may be formed either by an indentation in the base as shown, or by a raised portion on the base. The tubular member 12 is secured to the base 11 in sealing relationship by means of a suitable wedge-shaped circular sealing ring 14 which may be, for example, room temperature curing silicone rubber or, alternatively a removable gasket or grommet may be used. The gasket or grommet may be fitted into a groove and compressed against the inner surface of the tube opposite the bearing portion, thereby allowing easy disassembly of the unit or replacement of the tube. The particular type of sealant used is not critical but it must be insoluble in water and is preferably elastomeric in nature to maintain sealing relationship if the material of the tubular member 12 should stretch slightly when it is filled with water or should be accidently pulled while it is in the collapsed condition.

In order to prevent accidental spillage when the tubular member 12 is filled with water a rigidifying ring 16 of light weight material such as plastic or rubber may be provided around the circumference of the tube at its uppermost extremity. If desired, the rigidifying ring may be part of or support a perforated cover to prevent access to the aquarium contents by pets or small children.

Until water is placed in the tube 12 the entire unit may be collapsed in a vertical space approximately equal to the thickness of the base 11 and the width of the rigidifying ring 16. As water is poured into the open top of the tubular member 12, hydrostatic pressure causes the tube to expand and assume its full cylindrical shape.

A variety of aquarium accessories may be built into the base as desired. A particularly useful device which may easily be incorporated into the base of the present invention is a drain 17. As shown in FIGS. 2 and 3, the drain may include a drain tube 18 connected to a sealed fitting in aquarium bottom and extending out through the peripheral wall of the base. The end of the drain tube 18 may be provided with any suitable valve and connecting means 19 for controlling the flow and allowing attachment of a hose, if desired. The tube 18 may be flexible to allow it to be pushed back into the base leaving only the valve and connector 19 protruding from the base when not in use and withdrawn to its maximum extent from the base for use in draining. The use of this type of draining system allows lowering the water level with a minimum of disturbance to any aquatic life which the aquarium may contain and greatly lessens the danger of spillage.

If lighting is desired the base 11 may be provided with a transparent or translucent panel 21 which is sealed to the surrounding base portions and is adapted to transmit light into the water from a light source such as a fluorescent lamp 22 mounted beneath it. The lamp 22 may be connected to a suitable source of electrical power by means of a power cord 23 and a switch 24 mounted on a control panel on the base.

The light transmitting panel 21 may, for example, be unpigmented silicone rubber supported on a reinforcing grid of wire or the like. Silicone rubber is particularly useful in this application since besides passing light readily, it is also permeable to oxygen and carbon dioxide and in effect increases the air surface area of the water.

Low phenyl types of silicone rubber also have high ultraviolet transmission characteristics. Alternatively, a silicone rubber panel separate from the light transmitting panel may be provided solely to enhance oxygen absorption of the water.

For controlling the water temperature a heating element 26 may be provided. The heating element is shown connected to a thermostat 27 controlled by a thermocouple 28. One or more threaded holes 29 for accessory attachment are preferably provided in the base 11. The holes are sealed by a portion of base material which is adapted to be punched out as the accessory is screwed into the threaded portion.

The accessories shown are merely exemplary of possible variations of the invention. For further example, a mechanical aerating system can be incorporated in the base for providing additional oxygen absorption in the water. Instruments for scientific study of aquatic life, such as a microphone for transmitting underwater sounds, may be incorporated. A speaker may be included to project sounds into the water. Aside from the obvious advantage that devices incorporated in the base do not detract from viewing the aquarium contents, an additional safety factor is realized in greatly reducing the shock hazard inherent in these electrical devices. While installation of electrical equipment in prior art aquariums has been ordinarily a do-it-yourself project, factory testing to eliminate shock hazards in the water may easily be carried out with the present invention.

While the invention has been described for use as an aquarium it will be realized by those skilled in the art that it is adaptable for use for other purposes. Many variations of the invention other than those described, will also become obvious to those skilled in the art from a consideration of the foregoing. Therefore, it is to be understood that, within the scope of the appended claims, the invention may be practiced, otherwise than as specifically described.

That which is claimed is:
1. An aquarium comprising:
   a generally circular rigid base member having a circular vertically extending bearing portion on the top surface thereof,
   a non-rigid circular tubular member having one end thereof bearing against said bearing portion of said base member and the other end open to the atmosphere, and
   wedge-shaped circular sealing means for sealing said tubular member and said base member to provide watertight integrity to the unit, whereby said tubular member is adapted to be rigidified at least in part by hydrostatic pressure.
2. An aquarium as defined in claim 1 and further comprising a drain in said rigid base member.
3. An aquarium as defined in claim 2 wherein said drain comprises a tube retractible in and extensible from said base member.
4. An aquarium as defined in claim 1 and further comprising a light transmitting portion in said base and a light source positioned beneath said light transmitting portion.
5. An aquarium as defined in claim 4 wherein said light transmitting portion in said base is silicone rubber.
6. An aquarium comprising a generally circular rigid base member having a circular, vertically extending bearing portion on the top surface thereof,
   an unstable collapsible circular tubular member having one end thereof bearing against said bearing portion of said base member, said tubular member being adapted for expansion to cylindrical shape from its collapsed state by hydrostatic pressure, and
   a wedge-shaped circular sealing ring wedging said tubular member into contact with said bearing portion of said base member to provide water tight integrity to the unit.

References Cited by the Examiner
UNITED STATES PATENTS

| | | | |
|---|---|---|---|
| 867,463 | 10/1907 | Yingling | 119—5 |
| 1,389,132 | 8/1921 | Galavan | 240—2 |
| 1,723,272 | 8/1925 | Emma | 240—2 |
| 1,974,068 | 9/1934 | Greensaft | 119—5 |
| 1,986,018 | 1/1935 | Shoepfer | 119—5 |
| 2,144,551 | 1/1939 | Skolnick | 119—5 |
| 3,076,432 | 2/1963 | Jung et al. | 119—3 |
| 3,113,555 | 12/1963 | Overman | 119—5 |
| 3,168,887 | 2/1965 | Bodell | 119—3 |

SAMUEL KOREN, *Primary Examiner.*

ALDRICH F. MEDBERY, *Examiner.*